United States Patent
Pandey et al.

(10) Patent No.: US 9,940,599 B2
(45) Date of Patent: Apr. 10, 2018

(54) SYSTEMS AND METHODS FOR GENERATING SOLUTION RECOMMENDATIONS FOR POWER PLANT OPERATION

(71) Applicant: General Electric Company, Schenectady, NY (US)

(72) Inventors: Achalesh Kumar Pandey, Greenville, SC (US); Eric Kauffman, Atlanta, GA (US); Richard Kleinhample, Atlanta, GA (US); Daniel Kish, Atlanta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 163 days.

(21) Appl. No.: 13/971,316

(22) Filed: Aug. 20, 2013

(65) Prior Publication Data

US 2015/0058090 A1    Feb. 26, 2015

(51) Int. Cl.
     *G06Q 10/06*    (2012.01)
(52) U.S. Cl.
     CPC .............. *G06Q 10/0637* (2013.01)
(58) Field of Classification Search
     CPC ................................. G06Q 10/0637
     USPC ....................................... 705/7.19
     See application file for complete search history.

(56) References Cited

U.S. PATENT DOCUMENTS

| | | | |
|---|---|---|---|
| 5,164,897 A | 11/1992 | Clark et al. | |
| 5,167,010 A * | 11/1992 | Elm et al. ........... | 706/45 |
| 6,636,813 B1 | 10/2003 | Isobe et al. | |
| 6,944,759 B1 * | 9/2005 | Crisan .......... | G06F 8/64 702/123 |
| 6,973,376 B2 * | 12/2005 | Kusaka et al. ........... | 700/286 |
| 2001/0056315 A1 * | 12/2001 | Nagafuchi et al. ...... | 700/286 |
| 2002/0035495 A1 | 3/2002 | Spira et al. | |
| 2002/0040356 A1 * | 4/2002 | Gluck et al. ........... | 705/412 |
| 2007/0250615 A1 * | 10/2007 | Hillier ........... | H04L 41/0869 709/223 |
| 2008/0255899 A1 * | 10/2008 | McConnell ......... | G06Q 10/06 705/7.37 |
| 2009/0313496 A1 * | 12/2009 | Beekhuis ......... | G06Q 10/0637 714/2 |
| 2010/0274433 A1 | 10/2010 | Prokhorov et al. | |
| 2012/0166249 A1 | 1/2012 | Jackson | |
| 2012/0283988 A1 | 11/2012 | Pandey et al. | |
| 2013/0304747 A1 * | 11/2013 | Braham et al. ........... | 707/748 |

* cited by examiner

*Primary Examiner* — Matthew S Gart
*Assistant Examiner* — Scott M Ross
(74) *Attorney, Agent, or Firm* — Eversheds Sutherland (US) LLP

(57) ABSTRACT

Systems and methods for generating solution recommendations for power plant operation can be provided by certain embodiments of the disclosure. In one embodiment, a system may include a processor configured to collect power plant operational data from power plant components. The power plant operational data may be analyzed to identify cost factors for the power plant components. Based at least in part on the power plant operational data and the cost factors, upgrade opportunities for the power plant components may be determined. Financial values may be calculated for the upgrade opportunities. Based at least in part on the financial values, recommendations may be generated using a product interaction database and provided as an electronic output to a user.

16 Claims, 6 Drawing Sheets

SYSTEMS AND METHODS FOR GENERATING SOLUTION RECOMMENDATIONS FOR POWER PLANT OPERATION

TECHNICAL FIELD

This disclosure relates generally to data processing. More particularly, the disclosure relates to generating solution recommendations for power plant operation.

BACKGROUND

Modern power plants perform complex industrial operations involving coordination of sophisticated machines and processes. The power generation industry continuously looks for ways to improve performance and maintenance of power plants while maximizing profits. However, groups tasked with improving performance and maintenance may lack the software tools and specialized knowledge to achieve these goals.

BRIEF DESCRIPTION OF THE DISCLOSURE

The present disclosure relates to systems and methods for generating solution recommendations for power plant operation. According to one embodiment, a system may be provided. The system may include a processor and a memory comprising computer-readable instructions for execution by the processor. The processor may be configured to collect power plant operational data from one or more power plant components. The power plant operational data may be associated with one or more operating parameters associated with at least one type of operation of a power plant. The processor may be further configured to analyze the power plant operational data to identify one or more cost factors for the one or more power plant components. One or more upgrade opportunities for the one or more power plant components may be determined based at least in part on the power plant operational data and the one or more cost factors. Financial values may be calculated for the one or more upgrade opportunities. Based at least in part on the financial values, one or more recommendations may be generated using a product interaction database. The one or more recommendations may be provided as an electronic output to a user.

In one embodiment, a method may be provided. The method may include collecting, by a processor, power plant operational data from one or more power plant components. The power plant operational data may be related to one or more operating parameters associated with at least one type of operation of a power plant. The power plant operational data may be analyzed by the processor to identify one or more cost factors for the one or more power plant components. Based at least in part on the power plant operational data and the one or more cost factors, one or more upgrade opportunities may be determined by the processor for the one or more power plant components. Financial values may be calculated by the processor for the one or more upgrade opportunities. The method may further include generating, by the processor, one or more recommendations using a product interaction database based at least in part on the financial values. The one or more recommendations may be provided as an electronic output to a user.

In one embodiment, provided is a non-transitory computer-readable medium comprising instructions, which when executed by one or more processors, perform the following operations. In one operation, power plant operational data may be collected from one or more power plant components. The power plant operational data may be associated with one or more operating parameters associated with at least one type of operation of a power plant. In further operation, the power plant operational data may be analyzed to identify one or more cost factors for the one or more power plant components. In another operation, one or more upgrade opportunities for the one or more power plant components may be determined based at least in part on the power plant operational data and the one or more cost factors. In yet another operation, financial values for the one or more upgrade opportunities may be calculated. In yet another operation, based at least in part on the financial values, one or more recommendations may be generated using a product interaction database, and the one or more recommendations may be outputted to a user.

Other embodiments and aspects will become apparent from the following description taken in conjunction with the following drawings.

DETAILED DESCRIPTION

Figure 1:
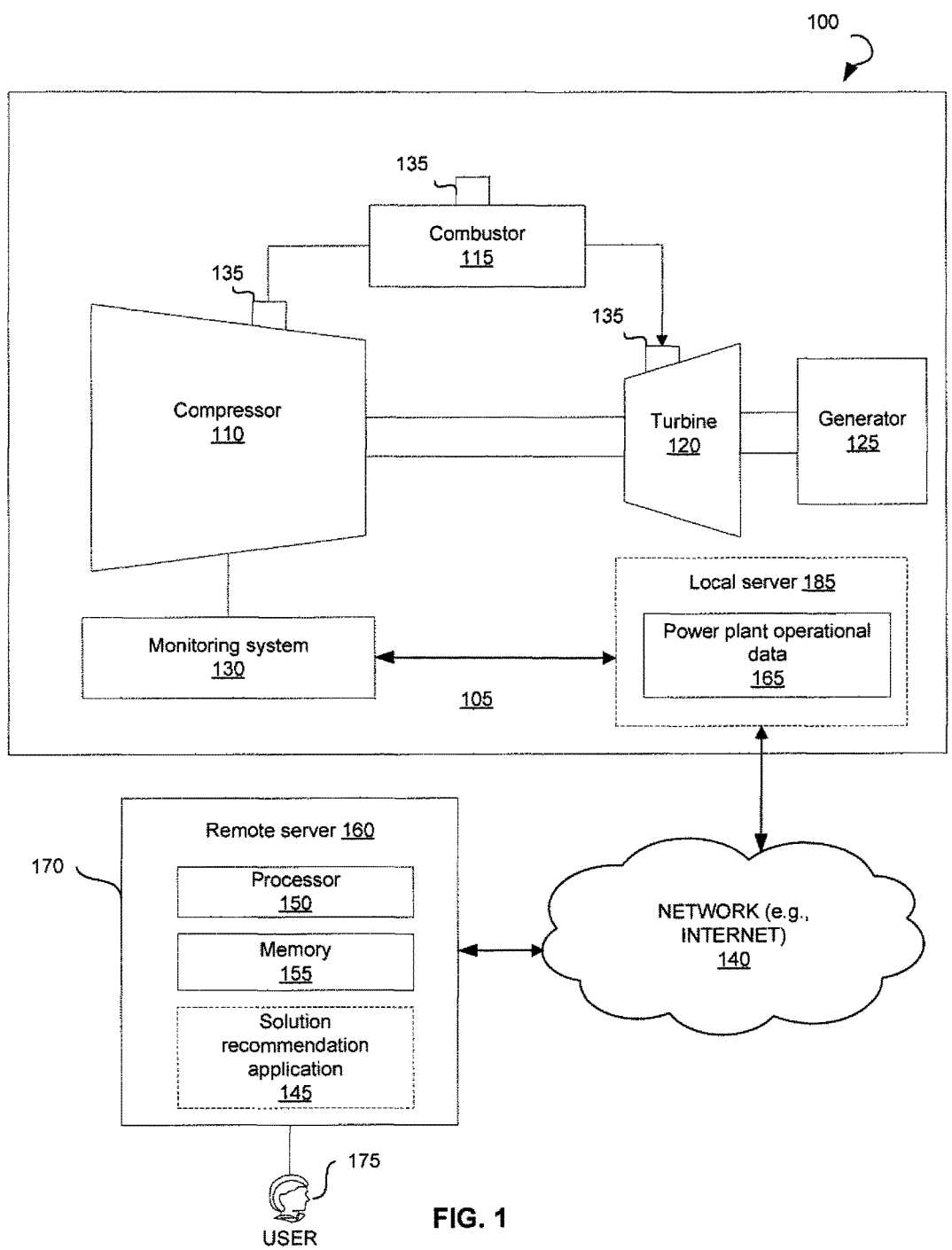
FIG. 1 depicts a simplified block diagram illustrating an example environment, in accordance with an embodiment of the disclosure.

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the present disclosure relate to systems and methods for generating solution recommendations for power plant operation. Complex operations implemented within a power plant often involve coordination of multiple components and associated processes. Many of the components within the power plant may include sensors or other monitoring equipment in conjunction with a computing device so that the real-time operating parameters of such components can be electronically monitored, collected, and analyzed. For example, some display panels within the power plant may be capable of displaying power plant operational data associated with the monitored respective components or processes within the plant.

The power plant operational data may be transmitted to a controller for further processing and analysis. This processed data may be used to identify cost factors for power plant components and processes associated with the components. The cost factors may cover most of the operating regimes of a power plant (for example, startup, base load, peak load, load turndown, shutdown, and so forth). Based on the cost factors, hardware/software upgrade opportunities may be identified for each power plant component, power plant unit, or a plurality of power plant units. An optimal solution recommendation may be generated, including a list of upgrade opportunities, and may be provided to a customer in the form of a report.

In certain example embodiments, the solution recommendation may be generated using a solution recommendation application, monitored power plant operational data, market data, and power plant configuration information. The solution recommendation application may be a web based remote application comprising a set of computer-readable and executable instructions that are stored on a non-transitory computer-readable medium. The application may be stored on a local server (for example, a server being provided locally to one or more power plants). The solution recommendation application may access and analyze power plant operational data, such as may be received from a controller interfaced with a plurality of sensors that are provided within a power plant for monitoring and capturing various monitored parameters of the power plant. In certain example embodiments, the application may be stored in a variety of locations local to or remote from the power plant.

In certain example embodiments, the solution recommendation application may calculate cost factors for power plant components based on operating parameters associated with at least one type of operation of a power plant, identify hardware and software upgrade opportunities, and provide an optimal package of recommendations for the power plant to a customer. The package of recommendations may include a list of hardware and/or software products to improve power plant reliability, performance, and scalability.

In certain example embodiments, financial values may be additionally calculated for the upgrade opportunities. The calculating of the financial values may be based at least in part on market data and user input data. Additionally, the financial values may be used for generating optimal hardware/software upgrade recommendations to maximize customer profits.

In certain example embodiments, a user may specify weights for one or more calculated cost factors. In one example embodiment, the user may select the cost factors. Based on the user input data and market data, the financial values may be calculated.

In certain example embodiments, the recommendations may be provided for different levels of power plant operation. The levels may include a component level, a unit level, or a fleet level.

A catalogue of hardware and software products for a power plant may be provided. The catalogue of hardware and software products may be stored in a product interaction database. The product interaction database may further include compatibility scores for one or more combinations of hardware and software products. The product interaction database may include quantitative scores, qualitative scores, or both. Some of these products may work synergistically with each other, while some of these products may have a negative impact if packaged together due to various incompatibilities. It should be understood that product interactions may be complimentary, neutral, or conflicting. The solution recommendation application may account for those interactions and provide an optimal package of recommendations. Thus, the recommendations may include a compatible combination of hardware and software products selected from the product interaction database to provide a financial benefit to the user based at least in part on a power plant configuration and the one or more cost factors.

The technical effects of certain embodiments of the disclosure may include providing a customer with optimal hardware/software upgrade opportunities for a power plant at certain prices, on the one hand, and providing an automated advisory tool to sales and application engineering teams to determine improvement areas of the power plant and more effectively sell hardware/software packages to customers, on the other hand.

Example embodiments of the disclosure will now be described with reference to the accompanying figures.

Referring now to FIG. 1, a simplified block diagram illustrates an environment 100 suitable for generating solution recommendations for power plant operation, in accordance with one or more example embodiments. A power plant 105 may include a variety of components, with each component having certain characteristics that may be monitored using a plurality of sensors 135 or other comparable monitoring equipment suitable to track operating parameters associated with the components of the power plant 105. The physical components shown and described with reference to FIG. 1 are simplified to provide a descriptive example of power plant components whose characteristics may be monitored in order to compile power plant operational data. As such, the components of FIG. 1 should in no way be considered a limiting feature of the disclosure.

As shown in FIG. 1, the power plant 105 may comprise a gas turbine 120 coupled to a compressor 110, and a combustor 115. The gas turbine 120 may drive a generator 125 that produces electrical power and supplies the electrical power through a breaker to an electrical grid.

The power plant 105 may further comprise a monitoring system 130 that may be configured to monitor and collect gas turbine operational data and transfer the operational data to a local server 185 of the power plant 105 or a remote server 160 associated with a solution recommendation provider 170. The solution recommendation provider 170 may be a third party or outsourced supplier that provides consulting, application, storage, and many other services associated with a power plant operation. The remote server 160 of the solution recommendation provider 170 may comprise a processor 150 and a memory 155 for storing data and/or computer-executable instructions. The processor 150 may comprise, or may be in communication with media (for example, computer-readable media), which stores instructions that, when executed by the processor 150, cause the processor 150 to perform the elements described herein. Furthermore, the processor 150 may operate any operating system capable of supporting locally executed applications, client-server based applications, and/or browser or browser-enabled applications.

The plurality of sensors 135 may detect various operating parameters of the gas turbine 120 and sense parameters of the environment. For example, temperature sensors may monitor ambient temperature surrounding the gas turbine 120, compressor discharge temperature, turbine exhaust gas temperature, and other temperature measurements of the gas stream through the gas turbine 120. Pressure sensors may monitor ambient pressure, static and dynamic pressure levels at the compressor inlet and outlet, and turbine exhaust, as well as at other locations in the gas stream. Further, humidity sensors (e.g., wet and dry bulb thermometers) may measure ambient humidity in the inlet duct of the compressor 110. The sensors 135 may also comprise flow sensors, speed sensors, flame detector sensors, valve position sensors, guide vane angle sensors, or the like, that sense various parameters pertinent to the operation of the gas turbine 120.

A primary component of the system for generating recommendation solutions for power plant operation corresponds to a solution recommendation application 145. The solution recommendation application 145 is a software-based module comprising a set of computer-readable and executable instructions that are stored on a tangible computer-readable medium. In the example of FIG. 1, the solution recommendation application 145 is stored on the remote server 160 of the solution recommendation provider 170. In certain example embodiments, the solution recommendation application 145 may be stored on the local server 185 being provided locally within the power plant 105. The solution recommendation application 145 may be configured to access and analyze power plant operational data 165, such as may be received from the monitoring system 130 interfaced with a plurality of sensors 135 that are provided within the power plant 105 for tracking and capturing various monitored operating parameters of the power plant 105.

Referring still to the solution recommendation application 145, the computer-readable information stored within such a software application includes various instructions for analyzing power plant operational data 165 in accordance with a variety of preconfigured definitions defining one or more power plant operations. Power plant operations may include but are not limited to starts, shutdowns, trips, load rejections, grid disturbances, fuel transfers, combustion mode transfers, islanded load steps, periods suitable for steady-state performance evaluation, loading, unloading, transients affecting component life, and so forth. Continuous real-time power plant operational data 165 that is received from the plurality of sensors 135 of the monitoring system 130 within power plant 105 may be stored on the local server 185 of the power plant 105.

Once the solution recommendation application 145 has automatically extracted power plant operational data 165 within various types of power plant operations, a user 175 may be able to access and further manipulate such data by accessing features associated with the solution recommendation application 145 via either a local computer or a remote computer, both of which may be coupled directly or indirectly via one or more wired or wireless connections to the local server 185 of the power plant 105. Remote computers may be coupled via a network 140, which may correspond to any type of network, including but not limited to a dial-in network, a utility network, public switched telephone network (PSTN), a local area network (LAN), wide area network (WAN), metropolitan area network (MAN), personal area network (PAN), virtual private network (VPN), campus area network (CAN), storage area network (SAN), the Internet, intranet or ethernet type networks, combinations of two or more of these types of networks or others, implemented with any variety of network topologies in a combination of one or more wired and/or wireless communication links.

Figure 2:
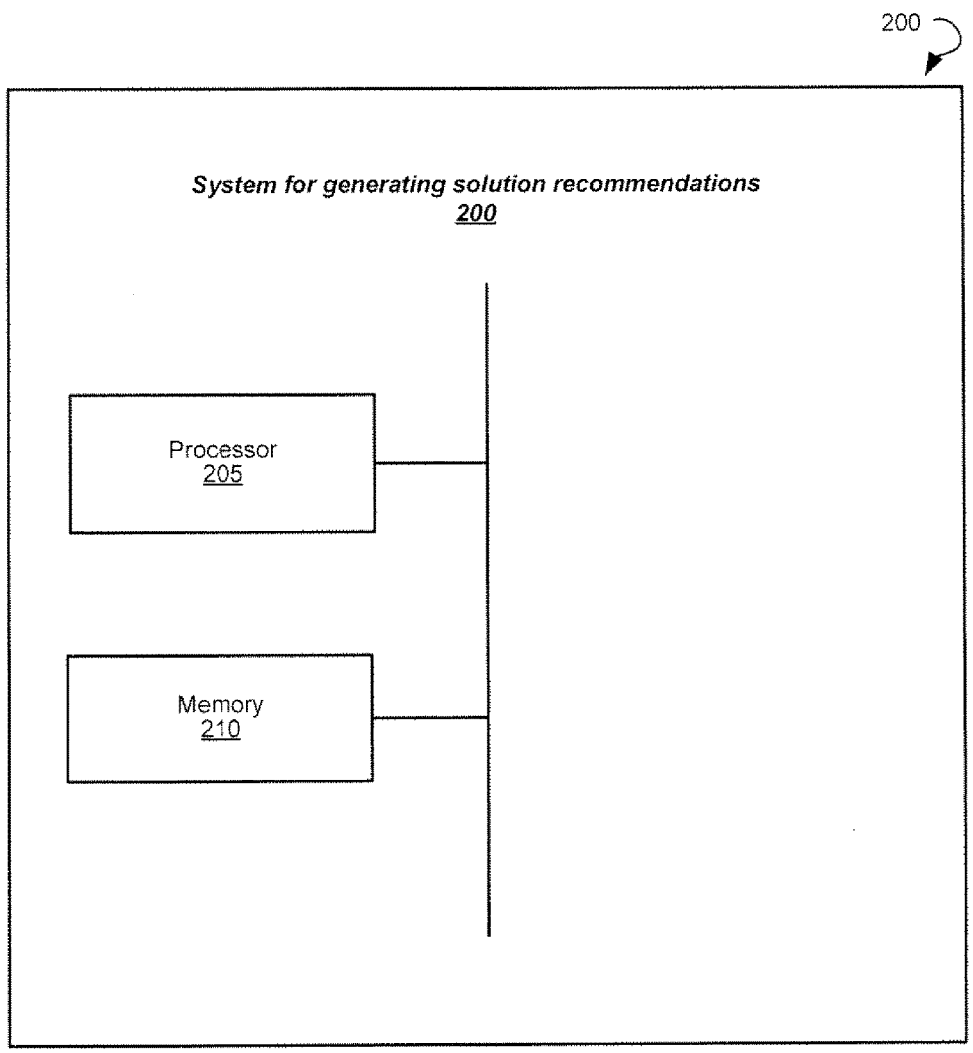
FIG. 2 depicts a simplified block diagram illustrating modules of a system for generating solution recommendations for power plant operation, in accordance with an embodiment of the disclosure.

FIG. 2 depicts a simplified block diagram illustrating modules of a system for generating solution recommendations for power plant operation, in accordance with an embodiment of the disclosure. Specifically, the system for generating solution recommendations for power plant operation 200 may include a processor 205 that may be configured to collect power plant operational data from one or more power plant components. The power plant operational data may be associated with one or more operating parameters associated with at least one type of operation of a power plant. The processor 205 may be also configured to analyze the power plant operational data to identify one or more cost factors for the one or more power plant components. Based at least in part on the power plant operational data and the one or more cost factors, one or more upgrade opportunities for the one or more power plant components may be determined by the processor 205.

The processor 205 may further be configured to calculate financial values for the one or more upgrade opportunities, and, based at least in part on the financial values, generate one or more recommendations using a product interaction database. The one or more solution recommendations may be generated for one or more of a power plant component, a power plant unit, or a plurality of power plant units. In certain embodiments, the generation of solution recommendations may be implemented based on the input of a user of the solution recommendation application 145 (shown on FIG. 1).

The processor 205 may be further configured to provide the one or more recommendations as an electronic output to a user. The one or more solution recommendations may include an electronic visualization on a computer screen or other display device or an electronic report. In certain embodiments, the one or more recommendations may be presented as a printed document, or electronic message to a mobile device, remote computer, or other electronic component. Example reports selectively provided as electronic output to a user may include component-specific, unit-specific, plant-specific or fleet-specific reports, scorecards, summaries or the like. Additional example visualizations selectively provided include overlap plots (e.g., single/multiple starts), correlation plots, 3D plots, box plots, interactive plots, scatter plots, matrix brushing, co-plots or other graphical formats.

The system for generating solution recommendations for power plant operation 200 may also include a memory 210 configured to store computer-readable instructions for execution by the processor 205 and data, such as operating parameters of a power plant, cost factors for one or more power plant components, and the like.

Figure 3:
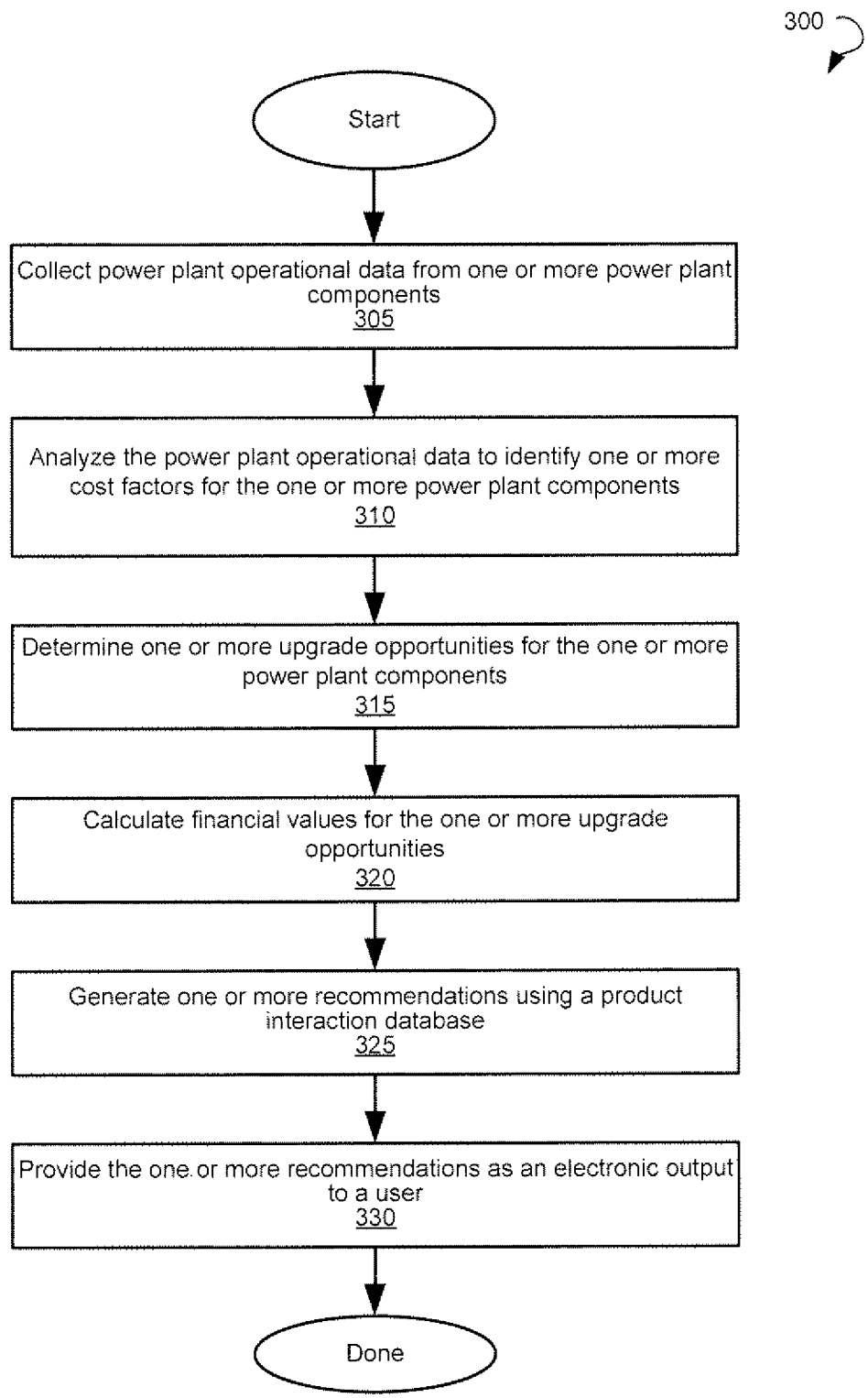
FIG. 3 depicts a process flow diagram illustrating a method for generating solution recommendations for power plant operation, in accordance with an embodiment of the disclosure.

FIG. 3 depicts a process flow diagram illustrating a method for generating solution recommendations for power plant operation 300, in accordance with an example embodiment of the disclosure. The method 300 may be performed by processing logic that may comprise hardware (e.g., dedicated logic, programmable logic, and microcode), software (such as software run on a general-purpose computer system or a dedicated machine), or a combination of both.

As shown in FIG. 3, the method 300 may commence at operation 305 with collecting power plant operational data from one or more power plant components. The power plant operational data may be related to one or more operating parameters associated with at least one type of operation of a power plant. The power plant operational data may be collected by an on-site monitoring system and may be transferred to a remote server associated with a solution recommendation provider.

Method 300 may proceed with analyzing the power plant operational data to identify one or more cost factors for the one or more power plant components, at operation 310. The one or more cost factors may include one or more of the following: a full load output, full load hours, part load hours, minimum load hours, start reliability, operating reliability, run emissions reduction, asset wear, outage interval extension, outage duration reduction, start fuel savings, start time duration, start emissions reduction, startup precision, fuel type flexibility, ramp rate, or turndown.

At operation 315, one or more upgrade opportunities for the one or more power plant components may be determined based at least in part on the power plant operational data and the one or more cost factors. The one or more upgrade opportunities may be determined based on the product interaction database, which may comprise a catalogue of various software and hardware products.

At operation 320, financial values for the one or more upgrade opportunities may be calculated. The calculation of the financial values may be based at least in part on market data and user input data. The user input data may include weights for the one or more cost factors.

Method 300 may proceed with generating, based at least in part on the financial values, one or more recommendations using a product interaction database, at operation 325. The one or more recommendations may be generated for one or more of a power plant component, a power plant unit, or a plurality of power plant units. The one or more recommendations may include a compatible combination of hardware and software products selected from the product interaction database to provide a financial benefit to the user based at least in part on a power plant configuration and the one or more cost factors.

In certain example embodiments, the product interaction database includes a catalogue of hardware and software products for the power plant. The product interaction database may also include compatibility scores for one or more combinations of hardware and software products for the power plant.

Method 300 may also involve providing the one or more recommendations as an electronic output to a user, at operation 330. The one or more solution recommendations may include an electronic visualization or an electronic report.

Figure 4:
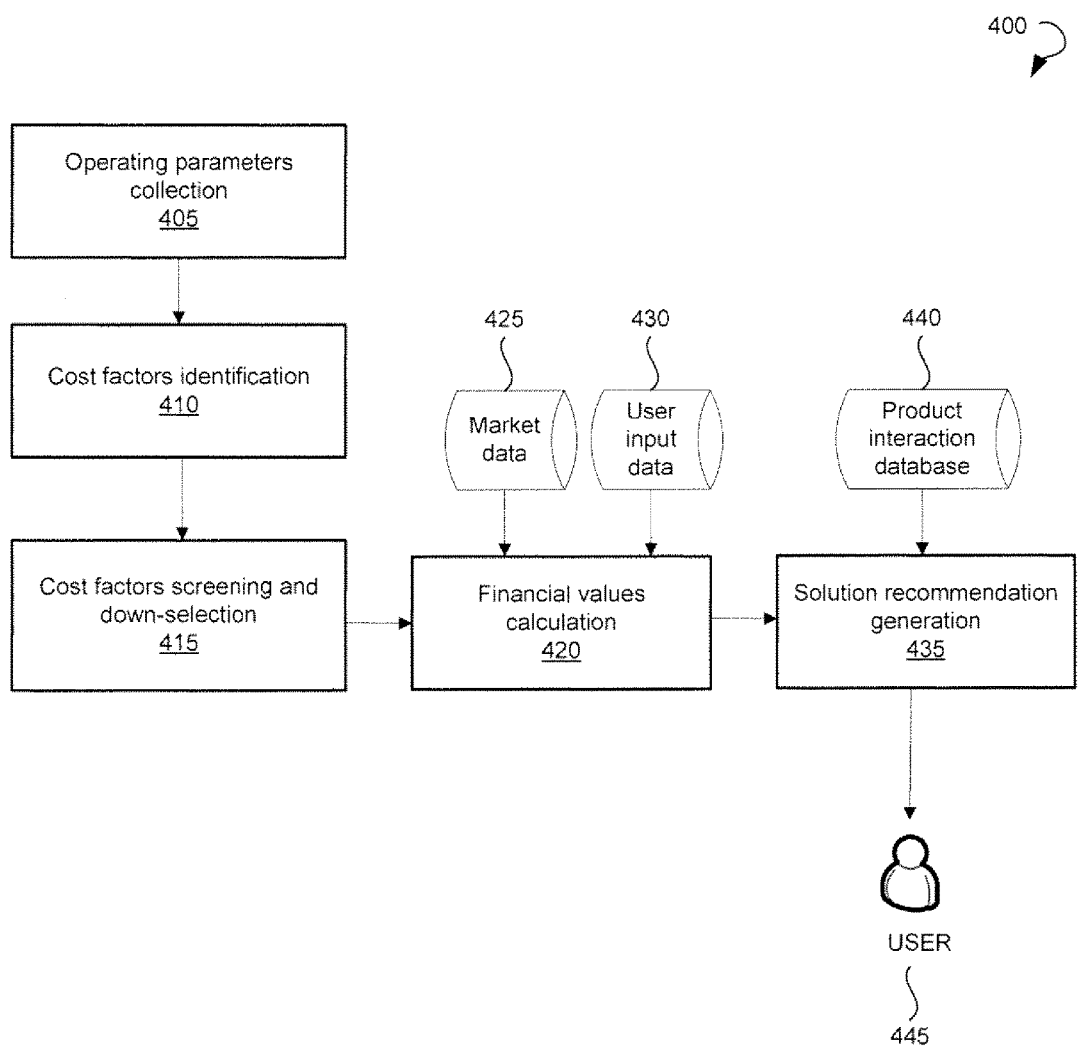
FIG. 4 depicts a process block diagram illustrating an example method for generating solution recommendations for power plant operation, in accordance with an embodiment of the disclosure.

FIG. 4 depicts a process block diagram illustrating an example method 400 for generating solution recommendations for power plant operation, in accordance with an embodiment of the disclosure.

At operation 405, data on various operating parameters may be collected by a monitoring system and stored in a database on a local server. The retrieved power plant data may be associated with one or more selected components within a power plant, one or more particular power plant units, or one or more fleets. The data may be further transmitted via a network to a remote server of a solution recommendation provider. A solution recommendation application may be installed on the remote server and configured to analyze the collected power plant operational data to identify one or more cost factors for the selected power plant component at operation 410. The one or more cost factors may be thereafter screened and down-selected at operation 415. The solution recommendation application may calculate financial values for one or more upgrade opportunities for the selected power plant component at operation 420. The calculation of the financial values may be based on market data 425 and user input data 430, which may include weights for the desired one or more cost factors associated with the selected power plant component. At operation 435, the solution recommendation application may read information from a product interaction database 440 and generate one or more solution recommendations. The product interaction database 440 may include a catalogue of hardware and software products for the power plant. The hardware and software products available in the product interaction database 440 may interact with each other. This may be a complementary, neutral, or conflicting interaction. Thus, the product interaction database 440 may further include compatibility scores for one or more combinations of hardware and software products for the power plant. The scores may be quantitative or qualitative. Based on this product interaction database 440 and calculated financial values, the solution recommendation application may provide one or more recommendations associated with upgrade opportunities of the selected power plant component, power plant unit, or plurality of power plant units. The one or more recommendations may then be provided to a user 445 in the form of a report or visualization. The user 445 may overwrite automated and default calculations at any step of the method. In one example embodiment, the user 445 may save the report in the database of the local server or a remote server associated with a solution recommendation provider and retrieve the report anytime later.

Figure 5:
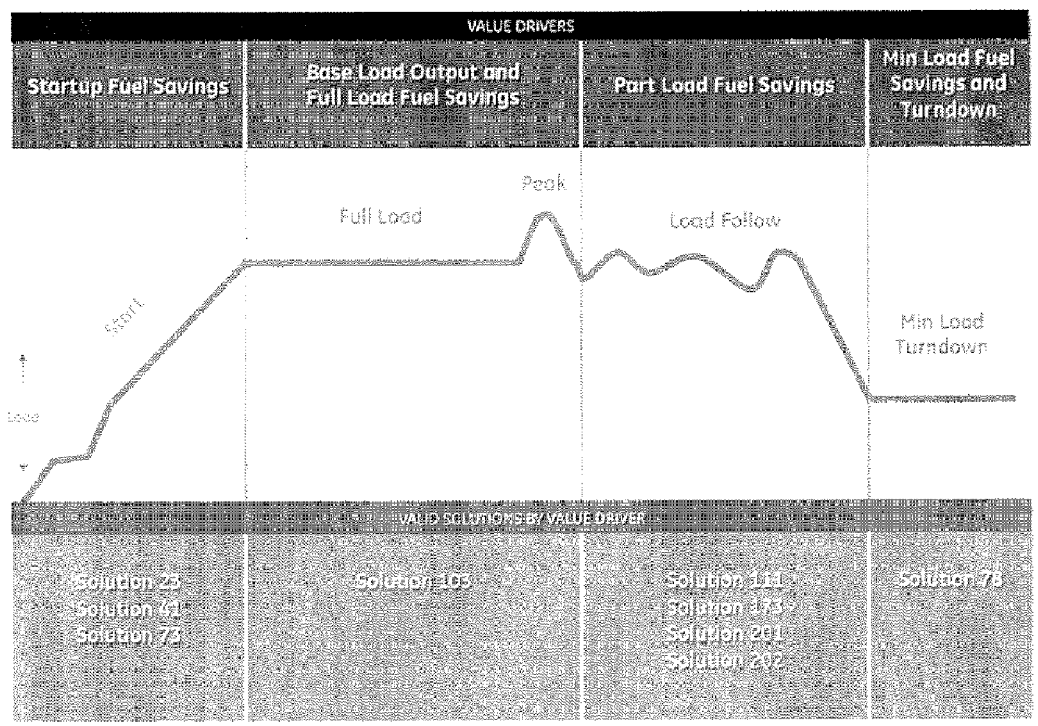
FIG. 5 depicts a diagram illustrating solutions for power plant operating regimes based on calculated cost factor values, in accordance with an embodiment of the disclosure.

FIG. 5 depicts a diagram illustrating solutions for power plant operations based on calculated cost factor values, in accordance with an embodiment of the disclosure. A curve depicted on FIG. 5 shows optimal solutions for each operating regime of the selected power plant component including start, full load, peak load, load follow, and minimum load turndown. The solutions are calculated based on the following cost factors: startup fuel savings, base load output, full load fuel savings, part load fuel savings, minimum load fuel savings, and turndown. The suggested valid solutions may be particularly advantageous for providing analytical information on improvement of startup, shutdown, and other operating regimes of the selected power plant component. The present diagram may be provided in the form of an electronic visualization on a computer screen or other display device.

Figure 6:
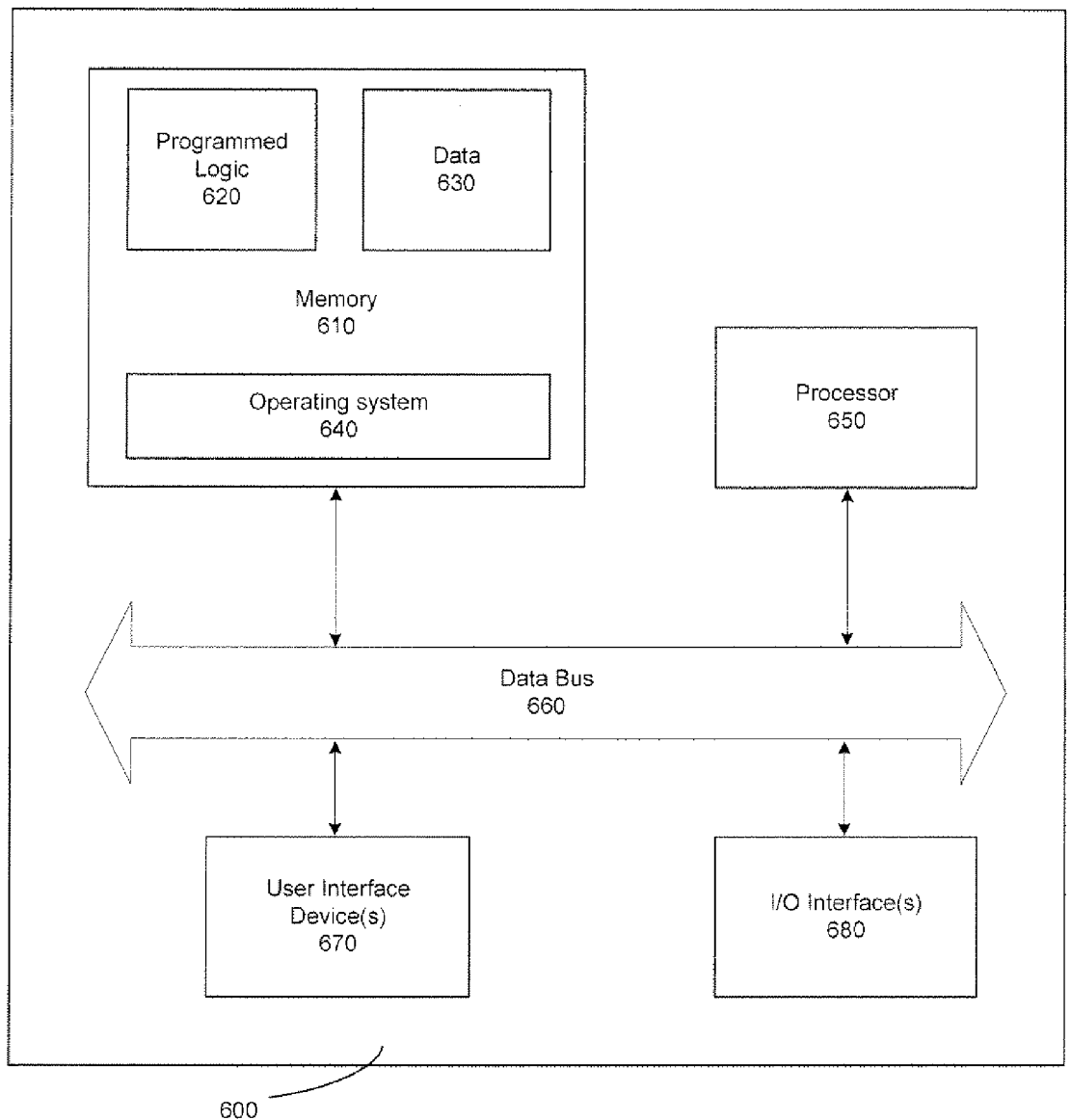
FIG. 6 is a schematic diagram illustrating a computer system for performing any one or more of the methods discussed herein, in accordance with an embodiment of the disclosure.

FIG. 6 depicts a block diagram illustrating a controller 600 for controlling a power plant, in accordance with an embodiment of the disclosure. More specifically, the elements of the controller 600 may be used to detect power plant operational data. The controller 600 may include a memory 610 that stores programmed logic 620 (e.g., software) and may store data 630, such as operating parameters of a power plant, cost factors for one or more power plant components, and the like. The memory 610 also may include an operating system 640. A processor 650 may utilize the operating system 640 to execute the programmed logic 620, and in doing so, may also utilize the data 630. A data bus 660 may provide communication between the memory 610 and the processor 650. Users may interface with the controller 600 via at least one user interface device 670 such as a keyboard, mouse, control panel, or any other device capable of communicating data to and from the controller 600. The controller 600 may be in communication with a power plant online while operating, as well as in communication with the power plant offline while not operating, via an input/output (I/O) interface 680. More specifically, one or more of the controllers 600 may carry out the execution of the model-based controller, such as, but not limited to, collecting power plant operational data from one or more power plant components, with the power plant operational data being related to one or more operating parameters associated with at least one type of operation of a power plant; analyzing the power plant operational data to identify one or more cost factors for the one or more power plant components; determining, based at least in part on the power plant operational data and the one or more cost factors, one or more upgrade opportunities for the one or more power plant components; calculating financial values for the one or more upgrade opportunities; generating one or more recommendations using a product interaction database based at least in part on the financial values; and providing, by the processor, the one or more recommendations as an electronic output to a user. Additionally, it should be appreciated that other external devices or multiple other power plants may be in communication with the controller 600 via the I/O Interface 680. In the illustrated embodiment, the controller 600 may be located remotely with respect to the power plant, although it may be co-located or even integrated with the power plant. Further, the controller 600 and the programmed logic 620 implemented thereby may include software, hardware, firmware, or any combination thereof. It should also be appreciated that multiple controllers 600 may be used, whereby different features described herein may be executed on one or more different controllers 600.

Accordingly, embodiments described herein allow generating solution recommendations for power plant operation, thus providing optimal hardware and software solutions to maximize profits of the power plant. With a method for generating solution recommendations for power plant operation, further actions associated with power plant operation optimization may be initiated.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and so forth.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
measuring, by at least one sensor, one or more operating parameters of a power plant;
collecting, by a processor, power plant operational data from one or more power plant components, the power plant operational data including the one or more operating parameters, wherein each of the operating parameters is associated with at least one type of operation of a power plant;
analyzing, by the processor, the power plant operational data to identify one or more cost factors for the one or more power plant components, wherein the one or more cost factors include one or more of the following: full load hours, part load hours, minimum load hours, operating reliability, asset wear, outage interval extension, outage duration reduction, fuel savings, emissions reduction, and fuel type flexibility;
determining, by the processor, based at least in part on the power plant operational data and the one or more cost factors, one or more upgrade opportunities for the one or more power plant components, wherein the one or more upgrade opportunities include a list of software and hardware products recommended for improvement of performance of the power plant;
calculating, by the processor, financial values for the one or more upgrade opportunities;
based at least in part on the financial values, generating, by the processor, one or more recommendations for upgrade of the one or more power plant components using a product interaction database, wherein the product interaction database includes compatibility scores for one or more combinations of hardware and software products, the one or more recommendations being generated with consideration of the compatibility scores for the one or more combinations of hardware and software products including one or more conflicting interactions between the combinations of hardware and software products;

providing, by the processor, the one or more recommendations as an electronic output to a user; and based on the one or more recommendations, facilitating a selective upgrade of at least one software component.

2. The method of claim 1, wherein the one or more recommendations are generated for one or more of a power plant component, a power plant unit, or a plurality of power plant units.

3. The method of claim 1, wherein the calculating of the financial values is based at least in part on market data and user input data.

4. The method of claim 3, wherein the user input data includes weights for the one or more cost factors.

5. The method of claim 1, wherein the product interaction database includes a catalogue of hardware and software products for the power plant.

6. The method of claim 1, wherein the one or more recommendations include a compatible combination of hardware and software products selected from the product interaction database to provide a financial benefit to the user based at least in part on a power plant configuration and the one or more cost factors.

7. The method of claim 1, wherein the power plant operational data is collected by an on-site monitoring system and is transferred to a server associated with a recommendation provider.

8. The method of claim 1, wherein the one or more solution recommendations include an electronic visualization or an electronic report.

9. A system comprising:

a processor;

at least one sensor configured to measure one or more operating parameters of a power plant;

a memory comprising computer-readable instructions for execution by the processor, wherein the processor is configured to:

collect power plant operational data from one or more power plant components, the power plant operational data including the one or more operating parameters, wherein each of the operating parameters is associated with at least one type of operation of a power plant;

analyze the power plant operational data to identify one or more cost factors for the one or more power plant components, wherein the one or more cost factors include one or more of the following: full load hours, part load hours, minimum load hours, operating reliability, asset wear, outage interval extension, outage duration reduction, fuel savings, emissions reduction, and fuel type flexibility;

determine, based at least in part on the power plant operational data and the one or more cost factors, one or more upgrade opportunities for the one or more power plant components, wherein the one or more upgrade opportunities include a list of software and hardware products recommended for improvement of performance of the power plant;

calculate financial values for the one or more upgrade opportunities;

based at least in part on the financial values, generate one or more recommendations for upgrade of the one or more power plant components using a product interaction database, wherein the product interaction database includes compatibility scores for one or more combinations of hardware and software products, the one or more recommendations being generated with consideration of the compatibility scores for the one or more combinations of hardware and software products including one or more conflicting interactions between the combinations of hardware and software products;

provide the one or more recommendations as an electronic output to a user; and based on the one or more recommendations, facilitate a selective upgrade of at least one software component.

10. The system of claim 9, wherein the one or more solution recommendations are generated for one or more of a power plant component, a power plant unit, or a plurality of power plant units.

11. The system of claim 9, wherein the calculating of the financial values is based at least in part on market data and user input data.

12. The system of claim 9, wherein the product interaction database includes a catalogue of hardware and software products for the power plant.

13. The system of claim 11, wherein the user input data includes weights for the one or more cost factors.

14. The system of claim 9, wherein the one or more recommendations include a compatible combination of hardware and software products selected from the product interaction database to provide a financial benefit for the user based at least in part on power plant configuration and the one or more cost factors.

15. The system of claim 9, wherein the power plant operational data is collected by an on-site monitoring system and is transferred to a server associated with a recommendation provider.

16. A non-transitory computer-readable medium comprising instructions, which when executed by one or more processors, perform the following operations:

measuring, by at least one sensor, one or more operating parameters of a power plant;

collecting, by a processor, power plant operational data from one or more power plant components, the power plant operational data including the one or more operating parameters, wherein each of the operating parameters is associated with at least one type of operation of a power plant;

analyzing, by the processor, the power plant operational data to identify one or more cost factors for the one or more power plant components, wherein the one or more cost factors include one or more of the following: full load hours, part load hours, minimum load hours, operating reliability, asset wear, outage interval extension, outage duration reduction, fuel savings, emissions reduction, and fuel type flexibility;

determining, by the processor, based at least in part on the power plant operational data and the one or more cost factors, one or more upgrade opportunities for the one or more power plant components, wherein the one or more upgrade opportunities include a list of software and hardware products recommended for improvement of performance of the power plant;

calculating, by the processor, financial values for the one or more upgrade opportunities;

based at least in part on the financial values, generating one or more recommendations for upgrade of the one or more power plant components using a product interaction database, wherein the product interaction database includes compatibility scores for one or more combinations of hardware and software products, the one or more recommendations being generated with consideration of the compatibility scores for the one or more combinations of hardware and software products including one or more conflicting interactions between the combinations of hardware and software products;
outputting the one or more recommendations to a user; and
based on the one or more recommendations, facilitating a selective upgrade of at least one software component.

\* \* \* \* \*